Patented May 12, 1953

2,638,461

UNITED STATES PATENT OFFICE 2,638,461

PENTADIENE POLYMERS AS ELASTOMER ADDITIVES

Willard M. St. John, Jr., Borger, Tex., assignor to Phillips Petroleum Company, a corporation of Delaware No Drawing. Application January 2, 1951, Serial No. 204,079

11 Claims. (Cl. 260—33.6)

This invention relates to elastomer compounding. In a more specific aspect this invention relates to new softeners, plasticizers and/or tackifiers for elastomers, synthetic and/or natural. In a still more specific aspect this invention relates to polypentadienes as softeners, plasticizers and/or tackifiers for synthetic and/or natural rubber.

Various types of materials have been employed as softeners, tackifiers and/or plasticizers for both natural and synthetic rubbers and it is known that variations in properties of rubber products can be produced through the use of different plasticizing agents. A good plasticizer, in addition to softening a rubber stock, must give a finished product with other desirable properties. Some materials which exert the desired plasticizing action often have deleterious effects on other properties to the extent that the finished products are of little value for many purposes. One of the disadvantages of many synthetic elastomers is that they do not possess sufficient tack. For this reason many synthetic elastomers are not desirable to use in carcass stocks. A plasticizer which gives a product of improved tack as well as other good physical properties is highly desirable.

I have now discovered that polymers of 1,3-pentadienes are good rubber plasticizers and give products with improved tack as well as other desirable physical properties. The new plasticizers, tackifiers or softeners of my invention can very advantageously be used in carcasses wherein synthetic elastomers are used. These plasticizers comprise polymers prepared from 1,3-pentadienes of the formula

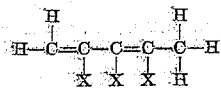

where X is hydrogen or methyl. Compounds which are applicable are 1,3-pentadiene itself, 2-methyl-1,3-pentadiene, 4-methyl-1,3-pentadiene, 2,4-dimethyl-1,3-pentadiene, 2,3,4-trimethyl-1,3-pentadiene, and the like. These polymers are viscous liquid or semi-solid materials. They are non-elastomeric, that is, not rubberlike, but they are vulcanizable along with the vulcanizable elastomer with which they are used. They are prepared by emulsion polymerization at low temperatures or by any other method which will yield the same type of product, such as the alkali metal, and/or alkali metal hydride catalyzed, mass polymerization methods of the art. Regardless of the method of preparation, these polypentadienes are unmodified, i. e., they are prepared in polymerization systems in the absence of a modifying agent such as a mercaptan. They are desirably prepared by emulsion polymerization, using the usual emulsifiers, etc., at temperatures below 15° C. and preferably below 0° C. down to —40° C. in highly activated recipes, such as those activated by iron pyrophosphate, diazothioether, or a polyalkylenepolyamine. The iron pyrophosphate recipes can be of the type which contain an easily oxidizable polyhydroxy compound, such as a sugar, or they can be free of such polyhydroxy compounds. Catalysts preferably employed in these systems, and also in the iron-free polyalkylenepolyamine recipes, are trisubstituted hydroperoxymethanes containing not to exceed 30 carbon atoms, such as those containing 10 to 30 carbon atoms per molecule, trialkyl hydroperoxymethane having from 6 to 9 carbon atoms per molecule, tertiary butyl hydroperoxide, arylcyclohexyl hydroperoxides, and the like. If desired, the hydroperoxides can be used in the form of their alkali metal salts. Pentadiene polymers thus produced are, as hereinbefore mentioned, semi-solid or viscous liquid materials. When using these polymers as softeners and tackifiers in the manner described in this invention, either single polymers or mixtures of polymers can be used.

It is an object of this invention to provide new elastomer compounding methods and additives and elastomer mixes.

Another object of this invention is to provide new elastomer compounding additives and new elastomer products resulting from their use.

It is another object of this invention to provide new softeners, plasticizers and/or tackifiers for elastomers, synthetic and/or natural, and new elastomer products with improved properties resulting from the use of such softeners, plasticizers and/or tackifiers.

Other objects and advantages of this invention will become apparent, to one skilled in the art, upon reading this disclosure.

The term "rubber," as used in this disclosure, is intended to cover both natural and synthetic rubbers. In its broadest aspect, my invention applies to providing softeners, plasticizers or tackifiers for vulcanizable organic elastomers containing unsaturated carbon to carbon bonds. My invention applies to softening, plasticizing or tackifying natural rubber or rubber-like polymers produced by the polymerization of aliphatic conjugated diolefins, particularly those having from 4 to 6 carbon atoms per molecule, such as butadiene, isoprene, pentadienes, etc., or the co-polymerization of such diolefins with a compound containing a $CH_2=C<$ group copolymerizable therewith, such as styrene, acrylonitrile, etc. Examples of such rubber-like polymers are polymers of butadiene-styrene, isoprene-styrene, butadiene-acrylonitrile, polybutadiene, etc. The softeners, plasticizers, or tackifiers of my invention can be used with butyl rubber stocks which are produced by co-polymerizing a major quantity of one or more monoolefins, such as isobutylene, with a minor quantity of a conjugated diolefin, such as those mentioned hereinbefore. The softeners, plasticizers, or tackifiers of my invention can be used with reclaimed natural or synthetic rubbers and to various mixtures of natural, synthetic, reclaimed natural and reclaimed synthetic rubber.

The plasticizing or softening agents of this invention are applicable in compounding both natural and synthetic rubbers. They are particularly valuable in improving the tack of low temperature synthetic elastomers, the relatively newly developed butadiene-styrene elastomers produced by emulsion polymerization at temperatures in the range of —20 to 15° C. being improved particularly well. In their preparation the monomers used are usually from 50 to 85 weight per cent butadiene. Low temperature synthetic rubbers in which these pentadiene polymers are incorporated are readily processable and have good physical properties. Similar effects are produced with other elastomers. One of the advantages of these plasticizers is that they are vulcanizable, i. e., they undergo vulcanization along with the rubber and become thoroughly incorporated in the vulcanizate. In this respect they differ from many of the commercial plasticizers which are not vulcanizable and therefore remain as unconverted materials in the finished product. These softeners can be incorporated into the rubber on a mill, in a Banbury mixer, etc., or, if preferred, they can be added to the latex. If they are added to the latex, it is desirable that they be added as a latex themselves. They can be added to the rubber before, during or after the addition of other compounding ingredients.

The amount of pentadiene polymer, or mixture of pentadiene polymers, employed as a plasticizer will vary depending upon the type of rubber stock being processed and the properties desired in the finished product. It will usually be in the range from 3 to 25 parts by weight per 100 parts by weight elastomer.

Vulcanizable organic elastomer compositions usually contain fillers; modifiers; softeners, tackifiers, and plasticizing substances; vulcanizing agents; age resistors or antioxidants; and accelerators of vulcanization. The exact composition of the vulcanizable organic elastomer composition depends upon the use to which the vulcanizable composition is to be put. The new softeners, plasticizers or tackifiers of my invention can be used in all of the commonly used compounding recipes.

Carbon black is added to many vulcanizable organic elastomer mixes during compounding as a filler. There are many types of carbon blacks used today in compounding, among which are: recently developed high pH furnace carbon blacks having a pH of from 8.0 to 10.5, usually 8.6 to 10.1, such as high abrasion furnace carbon blacks (HAF blacks), super abrasion furnace carbon blacks (SAF blacks) and high modulus furnace carbon blacks (HMF blacks); reinforcing furnace blacks (RF blacks) and very fine furnace blacks (VFF blacks); easy, medium, or hard processing channel blacks; lamp blacks; fine and medium thermal carbon blacks; acetylene carbon blacks; semi-reinforcing furnace carbon blacks; conductive furnace and conductive channel carbon blacks; and high elongation furnace carbon blacks. Other pigments or additives, such as ferric oxide, magnesium carbonate, titanium dioxide, zinc oxide, hydrated alumina, kieselguhr, slate dust, zinc peroxide, zinc chloride, lead peroxide, lead oxide, chlorinated paraffins, glue, barytes, fossil flour, lithopone, various clays, finely divided silica, whiting, etc., can be added as fillers or to modify the properties of the vulcanizable composition or vulcanized composition, such properties as the rate of cure, resistance to scorching during processing, activation of acceleration, etc.

Other softeners, tackifiers and plasticizing substances can be used in conjunction with the softeners, tackifiers and plasticizing materials of this invention, if desired. There are many such substances, among which are vegetable oils, such as palm oil, rape oil, olive oil, linseed oil, castor bean oil, soya bean oil, tung oil; bitumens including so-called mineral rubbers, which comprise natural products, such as gilsonite, rafaelite, and also high-boiling petroleum residues, asphalts, etc.; pine tar; paraffin wax; mineral oils; fatty acids, such as oleic acid, stearic acid, palmitic acid, lauric acid, etc.; ceresin; naphthalenes; rosin; wool grease; carnauba wax; the many organic chemical compounds, such as glycerol, glyceryl monostearate, glyceryl monooleate, glyceryl monoricinoleate, trioctyl phosphate, triglycol dioctoate, ethylene glycol monostearate and the mono-oleate, phenol-formaldehyde thermosetting resins, polyalpha-methyl styrene, and other polymers of styrene and substituted styrene, dioctyl phthalate, dioctyl sebacate, polybutenes, zinc resinate, coumarone resins, dihydroabietic acid, etc. Some of these compounds aid tackiness as well as soften or plasticize the vulcanizable organic elastomers. Also, some of them exhibit modifying characteristics.

Vulcanizing agents are added to vulcanize the organic elastomers during the vulcanization step of processing. There are a wide variety of vulcanizing agents, such as: sulfur, including powdered sulfur, or in one or more other forms, and mixtures thereof; so-called plastic sulfurs; sulfur-containing compounds, such as sulfur chloride, hydrogen sulfide, sulfur thiocyanate, tetraalkylthiuram disulfides, etc.; selenium; tellurium; benzoyl peroxide; trinitrobenzene; dinitrobenzene; nitrobenzene; quinones; certain inorganic oxidizing agents; diazoaminobenzene and its derivatives; other nitrogen-containing compounds, etc.

Accelerators of vulcanization are added to accelerate vulcanization during the vulcanization step of processing. There are many other known accelerators of vulcanization, such as: thioureas; thiophenols; mercaptans; dithiocarbamates; xanthates; trithiocarbamates; dithio acids, mercaptothiazoles; mercaptobenzothiazoles; thiuram sulfides; organic-cobalt chelates; etc., and various mixtures thereof. Some widely used and particularly good accelerators are, for instance, mercaptobenzothiazole, benzothiazyl disulfide, diphenylguanidine, zinc salt of mercaptobenzothiazole, zinc benzothiazyl sulfide, tetramethylthiuram disulfied, N-cyclohexyl-2-benzothiazole sulfenamide, aldehyde-ammonias, triphenylguanidine, zinc dibutyl and zinc dimethyl dithiocarbamate, many others, and mixtures thereof.

In most cases it is the usual practice to add age resistors or antioxidants to vulcanizable organic elastomer mixes during the mixing step of processing in order to slow down or prevent the deterioration of the vulcanized product. Antioxidants or age resistors have the property of maintaining tensile strength, resistance to abrasion, elasticity, preventing flex cracking, etc. One or more antioxidants are usually employed, such as phenyl-beta-naphthylamine, p-aminophenol, hydroquinone, p-hydroxydiphenyl, diphenylamine, 2,4-toluene diamine, p-ditolylamine, o-ditolylamine, beta-naphthyl-nitrosoamine, N,N'-diphenyl diaminoethane, phenyl - alpha - naphthylamine, p,p'-diamino-diphenylmethane, etc.

The vulcanizable organic elastomer compositions resulting from admixing the various ingredients with the new softeners, plasticizers and/or tackifiers of my invention by the methods known in the prior art, are vulcanized in the usual manner after they are molded or shaped into the desired shape by the numerous shaping operations of the prior art, such as calendering, casting from solution, continuous or discontinuous extrusion, molding in open or closed molds, etc., and they can be used for the many purposes for which other similar compositions are used. For example, they can be used for tire tubes, tire treads, tire casings, shoe soles and heels, raincoats, table covers, hose for the transmission of fluids, belts, balloon coverings, printer's rolls, printer's blankets, engraving plates, aprons, gloves, masks, tanks, battery cases, friction tape mats, wire insulation, etc. Fabrics can be coated or impregnated by calendering or impregnation with a suitable emulsion. The new softeners, plasticizers and/or tackifiers of my invention are particularly valuable in compounding carcass stocks, such as tire carcasses wherein from 10 to 35 parts by weight of carbon black per 100 parts by weight of elastomer are usually used.

The following are set forth as examples of my invention. It is to be understood that the quantities, materials, etc., set forth in the following examples, are not to unduly limit the scope of my invention.

*Example I*

Polymerization of methylpentadiene (85 per cent 2-methyl-1,3-pentadiene and 15 per cent 4-methyl-1,3-pentadiene) was effected at −10° C. according to the following recipe:

| | Parts by weight |
|---|---|
| Methylpentadiene | 100 |
| Water | 140 |
| Glycerine | 60 |
| Potassium laurate, 115% neutralized | 5 |
| Dimethyl (diisopropylphenyl) hydroperoxymethane | 0.71 |
| Tetraethylenepentamine | 1.14 |
| $K_4P_2O_7$ | 0.5 |

Boosters of 0.35 part hydroperoxymethane and 0.57 part tetraethylenepentamine were added during the run at 16.8, 40.8, and 72.7 hours, respectively. A conversion of 84.5 per cent was obtained in 117 hours. The polymer was a very soft, tacky material.

The basic recipe given above was used for the polymerization of 1,3-pentadiene (70 per cent trans-pentadiene, 20 per cent cis-pentadiene, and 10 per cent other material, chiefly cyclopentene) with boosters being added at 19, 43, and 67 hours, respectively. Instead of 0.35 part dimethyl(diisopropylphenyl) hydroperoxymethane, an equivalent amount of dimethyl(tert-butylphenyl) hydroperoxymethane was used in the last two boosters. A conversion of 71.8 per cent was reached in 118 hours. This polymer was also a very soft, tacky material.

The polypentadiene and polymethylpentadiene prepared as described above were evaluated in a carcass recipe using a 53 Mooney, −10° C. butadiene/styrene elastomer prepared with a mixed emulsifier consisting of 3.5 parts potassium rosin soap (Dresinate 214) and 1.5 parts fatty acid soap (potassium soap). A mixture of 5.0 parts Paraflux (an asphaltic flux) and 2.5 parts Staybelite resin (hydrogenated rosin: brittle solid with pale amber color and slight odor; sp. gr. 1.045; M. P., 76° C.; acid number, 162; saponification number, 167) was used as a control. The compounding recipe was as follows:

| | Parts by weight |
|---|---|
| Butadiene/styrene elastomer | 100 |
| Carbon black[1] | 25 |
| Zinc oxide | 3.0 |
| Stearic acid | 1.0 |
| Agerite resin D[2] | 1.0 |
| Softener[3] | 7.5 |
| Sulfur | 2.5 |
| N-cyclohexyl-2-benzothiazolesulfenamide | 1.0 |
| A-32[4] | 0.2 |

[1] A high abrasion furnace carbon black.
[2] Polymerized trimethyldihydroquinoline.
[3] Polymethylpentadiene, polypentadiene, or a mixture of 5.0 parts Paraflux and 2.5 parts Staybelite resin.
[4] Reaction product of butyraldehyde and butylidene aniline.

The stocks were cured 30 minutes at 307° F. and physical properties determined. The following results were obtained:

| | Softener | | |
|---|---|---|---|
| | Polymethylpentadiene | Polypentadiene | Paraflux+ Staybelite Resin |
| Unaged samples: | | | |
| Compounded Mooney, MS 1½ | 31.5 | 31.0 | 29.5 |
| Stress-strain properties at 80° F.— | | | |
| 300% Modulus, p. s. i | 1,380 | 1,320 | 1,090 |
| Tensile, p. s. i | 3,000 | 2,770 | 3,230 |
| Elongation, percent | 430 | 440 | 525 |
| Hysteresis, ΔT, °F | 34.8 | 34.4 | 34.4 |
| Resilience, percent | 76.6 | 77.5 | 76.2 |
| Flex life, M | 1.9 | 2.1 | 1.7 |
| Shore hardness | 54 | 52 | 52 |
| Compression set, percent | 10.6 | 10.2 | 12.1 |
| Tack (meter) | 320 | 200 | 40 |
| Oven-Aged 24 Hours at 212° F.: | | | |
| Stress-strain properties at 80° F.— | | | |
| 300% modulus, p. s. i | 1,980 | 1,980 | 1,650 |
| Tensile, p. s. i | 2,270 | 2,330 | 2,480 |
| Elongation, percent | 320 | 315 | 380 |
| Hysteresis, ΔT, °F | 34.4 | 34.4 | 32.7 |
| Resilience, percent | 77.5 | 79.6 | 80.0 |
| Flex life, M | <0.1 | <0.1 | 0.3 |
| Shore hardness | 59 | 58 | 57 |

The stocks containing the pentadiene polymers exhibited higher modulus in both unaged and aged samples and much better tack than the control.

EXAMPLE II

Polypentadiene and polymethylpentadiene, prepared as described in Example I, were evaluated as softeners in a tread recipe using two rubber stocks, a 50–55 Mooney viscosity butadiene/styrene elastomer prepared at 5° C. and a 53

Mooney butadiene/styrene elastomer prepared at −10° C. (see Example I). An asphalt softener (asphalt #6) was used as a control in each case. The rubber stocks were compounded as follows:

|  | 5° C. | −10° C. |
|---|---|---|
| Elastomer | 100 | 100 |
| Softener [1] | 5, 10 | 5, 10 |
| Carbon black [2] | 50 | 50 |
| Zinc oxide | 3.0 | 3.0 |
| Stearic acid | 1.0 | 0.0 |
| Sulfur | 1.75 | 1.75 |
| N-cyclohexyl-2-benzothiazolesulfenamide | 1.0 | 0.9 |

[1] Loadings of 5 and 10 parts, respectively, of polypentadiene and polymethylpentadiene, and 10 parts asphalt softener.
[2] A high abrasion furnace carbon black.

The samples were cured 30 minutes at 307° F. and physical properties determined. The following results were obtained:

|  | Softener | | | | |
|---|---|---|---|---|---|
|  | Polymethylpentadiene | | Polypentadiene | | Asphalt, 10 Parts |
|  | 10 Parts | 5 Parts | 10 Parts | 5 Parts | |
| 5° C. Elastomer— | | | | | |
| Unaged Samples: | | | | | |
| Compounded Mooney, MS 1½ | 43 | 50 | 44 | 49 | 45 |
| Stress-strain properties at 80° F.— | | | | | |
| 300% modulus, p. s. i. | 1,490 | 1,630 | 1,430 | 1,910 | 1,330 |
| Tensile, p. s. i. | 3,390 | 3,400 | 3,020 | 3,490 | 3,500 |
| Elongation, percent | 525 | 500 | 505 | 465 | 610 |
| Stress-Strain properties at 200° F.— | | | | | |
| Tensile, p. s. i. | 1,390 | 1,360 | 1,400 | 1,700 | 1,620 |
| Elongation, percent | 345 | 320 | 330 | 330 | 430 |
| Hysteresis, $\Delta T$, ° F. | 84.4 | 82.5 | 86.5 | 82.7 | 82.7 |
| Resilience, percent | 58.3 | 57.8 | 58.1 | 58.3 | 57.7 |
| Flex life, M | 7.6 | 5.6 | 6.0 | 5.9 | 22.5 |
| Shore hardness | 60 | 60.5 | 59.5 | 61 | 59 |
| Abrasion loss, grams | 2.45 | 2.33 | 3.32 | 2.55 | 2.40 |
| Compression set, percent | 20.3 | 20.0 | 21.2 | 19.2 | 21.1 |
| Extrusion, inches/minute | 36 | 38 | 38.5 | 37.5 | 37.5 |
| Extrusion, grams/minute | 94 | 97 | 97.5 | 97 | 100 |
| Tack, hand | 7+ | 7 | 6+ | 6+ | 6 |
| Oven-aged 24 Hours at 212° F.: | | | | | |
| Stress-strain properties at 80° F.— | | | | | |
| 300% modulus, p. s. i. | 2,940 | 2,960 | 2,590 | 3,500 | 2,290 |
| Tensile, p. s. i. | 3,170 | 3,100 | 2,920 | 3,660 | 3,330 |
| Elongation, percent | 320 | 315 | 330 | 315 | 500 |
| Hysteresis, $\Delta T$, ° F. | 64.2 | 66.2 | 64.2 | 64.9 | 64.2 |
| Resilience, percent | 64.7 | 65.3 | 65.0 | 65.8 | 59.8 |
| Flex life, M | 2.9 | 3.3 | 3.5 | 1.4 | 7.4 |
| Shore Hardness | 63 | 64 | 61 | 65 | 64 |
| Abrasion loss, grams | 3.36 | 3.03 | 4.00 | 3.00 | 3.46 |
| −10° C. Elastomer— | | | | | |
| Unaged Samples: | | | | | |
| Compounded Mooney, MS 1½ | 51 | 57 | 51.5 | 57.5 | 55.0 |
| Stress-strain properties at 80° F.— | | | | | |
| 300% Modulus, p. s. i. | 1,990 | 2,150 | 1,670 | 2,050 | 1,430 |
| Tensile, p. s. i. | 3,850 | 3,970 | 3,610 | 3,820 | 4,060 |
| Elongation, percent | 480 | 485 | 490 | 470 | 630 |
| Stress-strain properties at 200° F.— | | | | | |
| Tensile, p. s. i. | 1,940 | 2,060 | 1,830 | 1,860 | 2,130 |
| Elongation, percent | 360 | 330 | 315 | 340 | 470 |
| Hysteresis, $\Delta T$, ° F. | 68.3 | 66.9 | 68.9 | 69.7 | 72.6 |
| Resilience, percent | 62.1 | 64.3 | 63.5 | 64.2 | 61.3 |
| Flex life, M | 11.8 | 12.6 | 14.2 | 19.4 | 40.0 |
| Shore hardness | 64 | 64 | 62.5 | 63.5 | 62 |
| Abrasion loss, grams | 2.25 | 2.55 | 3.05 | 2.53 | 2.81 |
| Compression set, percent | 17.5 | 17.1 | 18.7 | 16.8 | 19.2 |
| Extrusion, inches/minute | 44.5 | 41.5 | 43.5 | 41 | 39.5 |
| Extrusion, grams/minute | 104.5 | 103.5 | 106 | 104 | 98.5 |
| Tack, hand | 7+ | 7 | 6+ | 6+ | 6 |
| Oven-Aged 24 Hours at 212° F.: | | | | | |
| Stress-strain properties at 80° F.— | | | | | |
| 300% modulus, p. s. i. | 3,180 | 3,200 | 3,090 | 3,050 | 2,490 |
| Tensile, p. s. i. | 3,300 | 3,600 | 3,300 | 3,500 | 3,500 |
| Elongation, percent | 400 | 400 | 320 | 350 | 500 |
| Hysteresis, $\Delta T$, ° F. | 61.5 | 61.5 | 62.2 | 61.9 | 66.5 |
| Resilience, percent | 67.0 | 68.2 | 68.0 | 69.3 | 66.7 |
| Flex life, M | 2.6 | 2.6 | 3.1 | 3.2 | 2.5 |
| Shore hardness | 65 | 67 | 64.5 | 66 | 64 |
| Abrasion loss, grams | 3.48 | 2.96 | 3.81 | 3.26 | 4.30 |

The above data show that the pentadiene polymers impart higher modulus and tack than the control in both the 5° C. and −10° C. stocks.

EXAMPLE III

Polypentadiene and polymethylpentadiene, prepared as described in Example I were evaluated as softeners in a tread recipe using GR-S, butadiene-styrene polymer produced by emulsion polymerization at 120–125° F., as the rubber stock. An asphalt softener (asphalt #6) was used as a control in each case. The following compounding recipe was used:

|  | Parts by weight |
|---|---|
| GR-S | 100 |
| Softener [1] | 10.5 |
| Carbon black [2] | 50 |
| Zinc oxide | 3.0 |
| Sulfur | 1.75 |
| N-cyclohexyl-2-benzothiazolesulfenamide | 0.80 |

[1] Loadings of 5 and 10 parts, respectively, of polypentadiene, polymethylpentadiene, and asphalt softeners.
[2] A high abrasion furnace carbon black.

The samples were cured at 307° F. to 20 percent compression set and the physical properties determined. The following results were obtained.

|  | Softener | | | | | |
|---|---|---|---|---|---|---|
|  | Polymethyl-pentadiene | | Poly-pentadiene | | Asphalt | |
|  | 10 Parts | 5 Parts | 10 Parts | 5 Parts | 10 Parts | 5 Parts |
| Unaged Samples: | | | | | | |
| Compounded Mooney at 212° F., MS 1½ | 32.5 | 36 | 33 | 36 | 33 | 38 |
| Minutes' cure to 20% Compression set | 33 | 33 | 34 | 33.5 | 37 | 34 |
| Stress-strain properties at 80° F.— | | | | | | |
| 300% Modulus, p. s. i. | 1,800 | 2,230 | 1,745 | 2,070 | 1,480 | 1,640 |
| Tensile, p. s. i. | 2,670 | 2,830 | 2,590 | 2,770 | 2,720 | 2,860 |
| Elongation, percent | 390 | 365 | 400 | 370 | 535 | 450 |
| Hysteresis, ΔT, °F | 77.0 | 74.6 | 79.0 | 75.2 | 77.9 | 75.2 |
| Resilience, percent | 57.2 | 59.0 | 58.9 | 59.3 | 58.1 | 58.5 |
| Flex life, M | 0.9 | 0.5 | 1.3 | 1.9 | 6.8 | 4.3 |
| Shore hardness | 58 | 60 | 56 | 59 | 57.5 | 59 |
| Abrasion loss, grams [1] | 3.10 | 2.80 | 4.04 | 3.12 | 2.91 | 2.76 |
| Extrusion at 250° F.— | | | | | | |
| Inches/minute | 40 | 40.3 | 40.4 | 42.2 | 37.0 | 37.3 |
| Grams/minute | 100 | 104 | 102.5 | 110.5 | 105 | 103 |
| Tack, immediate | 5 | 5 | 4 | 4 | 4 | 4 |
| Tack, after 24 hours | 6+ | 6— | 4 | 4 | 3— | 3 |
| Power, watt hours— | | | | | | |
| Mill | 840 | 990 | 960 | 910 | 1,100 | 1,050 |
| Remill | 350 | 330 | 320 | 350 | 360 | 370 |
| Oven-Aged 24 Hours at 212° F.: | | | | | | |
| Stress-strain properties at 80° F.— | | | | | | |
| 300% modulus, p. s. i. | 2,400 | -------- | 2,300 | -------- | 2,200 | 2,900 |
| Tensile, p. s. i. | 2,550 | 2,740 | 2,550 | 2,680 | 2,990 | 2,970 |
| Elongation, percent | 270 | 280 | 290 | 270 | 380 | 300 |
| Hysteresis, ΔT, °F | 64.9 | 63.5 | -------- | 64.5 | 64.2 | 62.8 |
| Resilience, percent | 63.7 | 65.3 | 63.6 | 65.1 | 62.5 | 64.1 |
| Flex life, M | 0.8 | 0.9 | 0.8 | 1.6 | 4.1 | 2.7 |
| Shore hardness | 65 | 66 | 64 | 66 | 64 | 66 |
| Abrasion loss, grams [1] | 2.65 | 2.47 | 3.16 | 2.68 | 3.21 | 2.73 |

[1] 35 minute cure.

As in the previous examples, the above samples containing the pentadiene polymers show higher modulus and better tack than those containing the asphalt softener.

As will be evident to those skilled in the art, various modifications of this invention can be made, or followed, in the light of this disclosure and discussion, without departing from the spirit or scope of this disclosure or from the scope of the claims.

I claim:

1. The vulcanizable composition of claim 8 wherein said viscous liquid polymer is a polymer of 1,3-pentadiene.

2. The composition of matter of claim 8 wherein said viscous liquid polymer is a polymer of monomethyl-1,3-pentadienes.

3. The composition of claim 8 wherein said vulcanizable elastomer is a copolymer prepared by copolymerization of butadiene and styrene monomers in an emulsion system at a temperature of from −20 to 15° C., said butadiene being present in an amount of from 50 to 85 weight per cent of the total weight of said monomers, and said viscous liquid polymer is present in an amount of from 3 to 25 parts by weight per 100 parts by weight of said vulcanizable elastomer.

4. The composition of claim 3 wherein said viscous liquid polymer is a polymer of 1,3-pentadiene.

5. The composition of claim 8 wherein said vulcanizable elastomer is natural rubber, and said viscous liquid polymer is present in an amount of from 3 to 25 parts by weight per 100 parts by weight of said natural rubber.

6. The process of claim 9 wherein said viscous liquid polymer is a polymer of 1,3-pentadiene added in an amount of from 3 to 25 parts by weight per 100 parts by weight of said vulcanizable elastomer.

7. The process of claim 9 wherein said viscous liquid polymer is a polymer of monomethyl-1,3-pentadienes added in an amount of from 3 to 25 parts by weight per 100 parts by weight of said vulcanizable elastomer.

8. A rubber-like, sulfur vulcanizable composition comprising, a rubber-like vulcanizable organic elastomer selected from the group consisting of natural rubber and synthetic polymers of conjugated diolefins; and a viscous liquid polymer prepared from monomers consisting of pentadienes of the formula

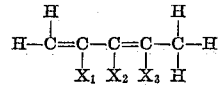

where $X_1$ is selected from the group consisting of hydrogen and a methyl radical, $X_2$ is selected from the group consisting of hydrogen and a methyl radical and $X_3$ is selected from the group consisting of hydrogen and a methyl radical.

9. In a process of processing rubber-like, sulfur vulcanizable organic elastomers selected from the group consisting of natural rubber and synthetic polymers of conjugated diolefins; that improvement which comprises adding to said rubber-like vulcanizable organic elastomer as a plasticizer a viscous liquid polymer prepared from monomers consisting of pentadienes of the formula

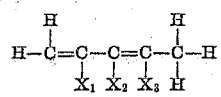

where $X_1$ is selected from the group consisting of hydrogen and a methyl radical, $X_2$ is selected from the group consisting of hydrogen and a methyl radical and $X_3$ is selected from the group consisting of hydrogen and a methyl radical.

10. A rubber-like, sulfur rubber-like vulcanizable composition comprising, a vulcanizable organic elastomer selected from the group consisting of natural rubber and synthetic polymers of conjugated diolefins; and a viscous unmodified liquid polymer prepared from monomers consisting of pentadienes of the formula

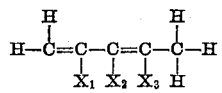

where $X_1$ is selected from the group consisting of hydrogen and a methyl radical, $X_2$ is selected from the group consisting of hydrogen and a methyl radical and $X_3$ is selected from the group consisting of hydrogen and a methyl radical.

11. In the process of processing rubber-like sulfur vulcanizable organic elastomer selected from the group consisting of natural rubber and synthetic polymers of conjugated diolefins to produce elastomer products, that improvement which comprises adding to said rubber-like vulcanizable organic elastomer as a plasticizer a liquid viscous unmodified liquid polymer prepared from monomers consisting of pentadienes of the formula

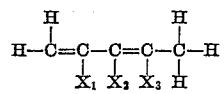

where $X_1$ is selected from the group consisting of hydrogen and a methyl radical, $X_2$ is selected from the group consisting of hydrogen and a methyl radical and $X_3$ is selected from the group consisting of hydrogen and a methyl radical.

WILLARD M. ST. JOHN, Jr.

References Cited in the file of this patent

UNITED STATES PATENTS

| Number | Name | Date |
|---|---|---|
| 2,521,361 | Gessler | Sept. 5, 1950 |